(12) United States Patent
Khafagy et al.

(10) Patent No.: US 6,510,036 B1
(45) Date of Patent: Jan. 21, 2003

(54) METHOD AND APPARATUS TO ELIMINATE INADVERTENT HORN ACTIVATION

(75) Inventors: Hafiz S Khafagy, Rochester, MI (US); Ronald Helmut Haag, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 1 days.

(21) Appl. No.: 09/723,735

(22) Filed: Nov. 28, 2000

(51) Int. Cl.[7] .......................... H01H 47/00; H01H 47/32
(52) U.S. Cl. ....................... 361/156; 307/10.1
(58) Field of Search ........................... 361/156; 307/9.1, 307/10.1; 200/61.54, 61.55

(56) References Cited

U.S. PATENT DOCUMENTS

| | | | | |
|---|---|---|---|---|
| 3,771,122 A | * | 11/1973 | Sattler | 340/62 |
| 3,956,732 A | * | 5/1976 | Teich | 340/64 |
| 3,967,239 A | | 6/1976 | Steele | 340/63 |
| 3,983,534 A | * | 9/1976 | Goodman | 340/63 |
| 4,897,632 A | | 1/1990 | Hock et al. | 340/457 |
| 5,961,144 A | * | 10/1999 | Desmarais | 280/731 |
| 5,965,952 A | * | 10/1999 | Podoloff et al. | 307/10.1 |
| 6,147,315 A | * | 11/2000 | Rudolph et al. | 200/61.54 |
| 6,236,309 B1 | * | 5/2001 | Haag et al. | 340/438 |
| 6,271,746 B1 | * | 8/2001 | Lisiak et al. | 340/425.5 |

* cited by examiner

*Primary Examiner*—Stephen W. Jackson
*Assistant Examiner*—Z Kitov
(74) *Attorney, Agent, or Firm*—Kathryn A. Marra

(57) ABSTRACT

A horn activation system, which activates a switch for driving a horn, the horn activation system includes a discriminating device that discriminates between the forces being applied to the switch. The discrimination device connects the switch to a power supply for activating the horn when the force being applied to the switch is applied for a time period greater than a predetermined value.

11 Claims, 5 Drawing Sheets

METHOD AND APPARATUS TO ELIMINATE INADVERTENT HORN ACTIVATION

TECHNICAL FIELD

The present invention relates generally to vehicle horn systems and, more particularly, vehicle horn systems used in conjunction with an airbag module.

BACKGROUND

Driver side airbag modules, which include an airbag cushion and an airbag module cover, are normally positioned within a hub of a steering wheel of an automobile. This happens to be the same area, which conventionally includes the horn switch. Accordingly, the airbag module cover must additionally serve to actuate the horn switch.

Horn switch designs have included a floating horn switch. Floating horn switches typically comprise a pair of conductive members, one of which is movable with respect to the other, and when in. a relaxed state, the movable member is biased away from the other. Applied pressure on the movable member pushes the conductive members together to close a circuit and actuate the horn. Pressure is applied to the horn switch by the airbag module cover in the hub of the steering wheel, which is depressed by the driver.

The introduction of the airbag module at the steering wheel hub complicated the design of the horn switch and the airbag module cover. For example, the cover should not require an unreasonable degree of depression or an unreasonable amount of applied pressure to actuate the horn switch, the horn switch should not be susceptible to inadvertent actuation, and the horn switch must not become unattached from the airbag module cover upon inflation of the airbag.

In some horn switch and airbag module cover configurations, the switch was compressed against the folded airbag cushion located behind the airbag module cover. These configurations required a large degree of airbag module cover depression and a large amount of force to activate the switch.

Other horn switch and airbag module cover configurations attempted to overcome these problems by securing the switch directly to the airbag module cover or tightly sandwiching the switch between the cover and an attached switch backing plate. However, these combinations made the switches susceptible to inadvertent actuation due to thermal contraction or expansion of the airbag module cover at extreme temperatures. In addition, the amount of pressure required to activate the horn switch also varied substantially as a function of ambient temperature, which affects the flexibility of the cover and backing plate.

Another type of inadvertent horn activation can occur from the vehicle operator releasing the steering wheel till to mechanism causing the steering rail to travel from either its lowest or highest tilt position to it's complementary opposite position. This motion can cause a high g-force to be applied to the steering wheel due to it's abrupt stopping. Such an abrupt stopping may cause a floating horn switch to close and open very quickly (commonly referred to as switch bounce), which turns the horn relay on. This is particularly true when the steering column is released from its lowermost position and is allowed to travel freely to it's highest allow position.

In addition, switch bouncing and inadvertent horn activation may be caused by steering column vibrations that are encountered as the vehicle travels over a bumpy road.

Accordingly, it is desirable to provide an airbag module cover having a horn switch that does not require an unreasonable degree of cover depression or an unreasonable amount of applied pressure for actuation, and is not susceptible to inadvertent actuation resulting from g-forces related to the tilting of the steering wheel column and/or the vehicle traveling over a bumpy surface.

SUMMARY OF THE INVENTION

A horn activation system, which activates a switch for driving a horn, the horn activation system includes a discriminating device that discriminates between the forces being applied to the switch. The discrimination device connects the switch to a power supply for activating the horn when the force being applied to the switch is applied for a time period greater than a predetermined value.

In one embodiment, the switch is a floating horn switch and the predetermined value is sufficiently large enough to eliminate the majority of inadvertent horn activations due to switch bounce.

In another embodiment, the horn activation system is utilized with a steering system having an airbag module.

The above-described and other features and advantages of the present invention will be appreciated and understood by those skilled in the art from the following detailed description, drawings, and appended claims.

DESCRIPTION OF THE PREFERRED EMBODIMENT

Figure 1:
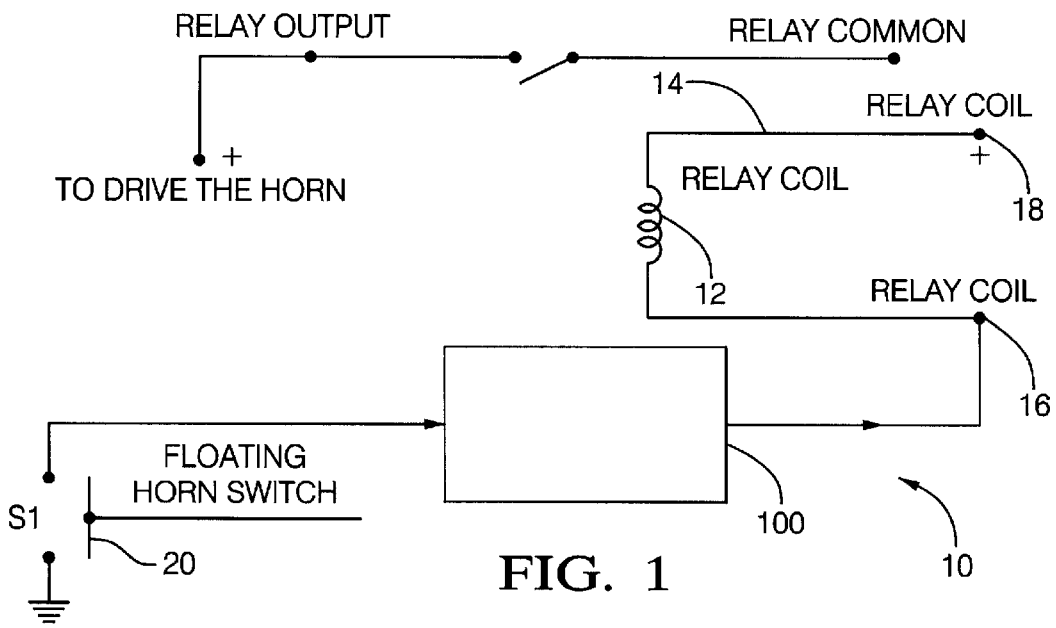
FIG. 1 depicts a horn circuit with control circuit logic.

Referring now to FIG. 1 depicting a diagram of the horn circuit 10 employed in an exemplary embodiment of the invention. Typically, the relay coil 12 is connected in a manner such that the relay coil high side 14 is connected to a voltage supply 18, while the relay coil low side 16 of the relay coil 12 is connected via a horn switch 20 to a ground, thereby completing the circuit connection to allow engagement of the relay 12. Upon activation for the floating horn switch 20 the relay coil is energized, thereby closing the relay contacts and sounding the horn. In an embodiment, a control circuit 100 is interposed into the horn circuit 10 to control the engagement of the relay 12 upon activation of the floating horn switch 20. The control circuit 100 is configured to recognize when a demand for the horn has been made and yet distinguish between operator demands and inadvertent horn switch 12 activations. The control circuit 100 achieves the desired operation by applying a predetermined time delay to the activation of the relay coil 12, which in turn, activates the horn. Further, the control circuit 100 is configured to function over a wide range of the supply voltage 18. In fact, circuit 10 does not require a true 12 volt power lead coming into the steering column. Of course, circuit 10 can be operated with a 12 volt power lead if one is available within the confines of the steering wheel assembly.

In addition, and in applications where circuit 10 has been incorporated into the horn activation system, the amount of force a user must apply to the surface of a steering wheel can be reduced as the undesirable effects of such a biasing force reduction are eliminated through the implementation of circuit 10, which eliminates inadvertent horn activations. Thus, the required force for activating a horn may be reduced without the deleterious effects of inadvertent horn activation through switch bounce.

Figure 2:
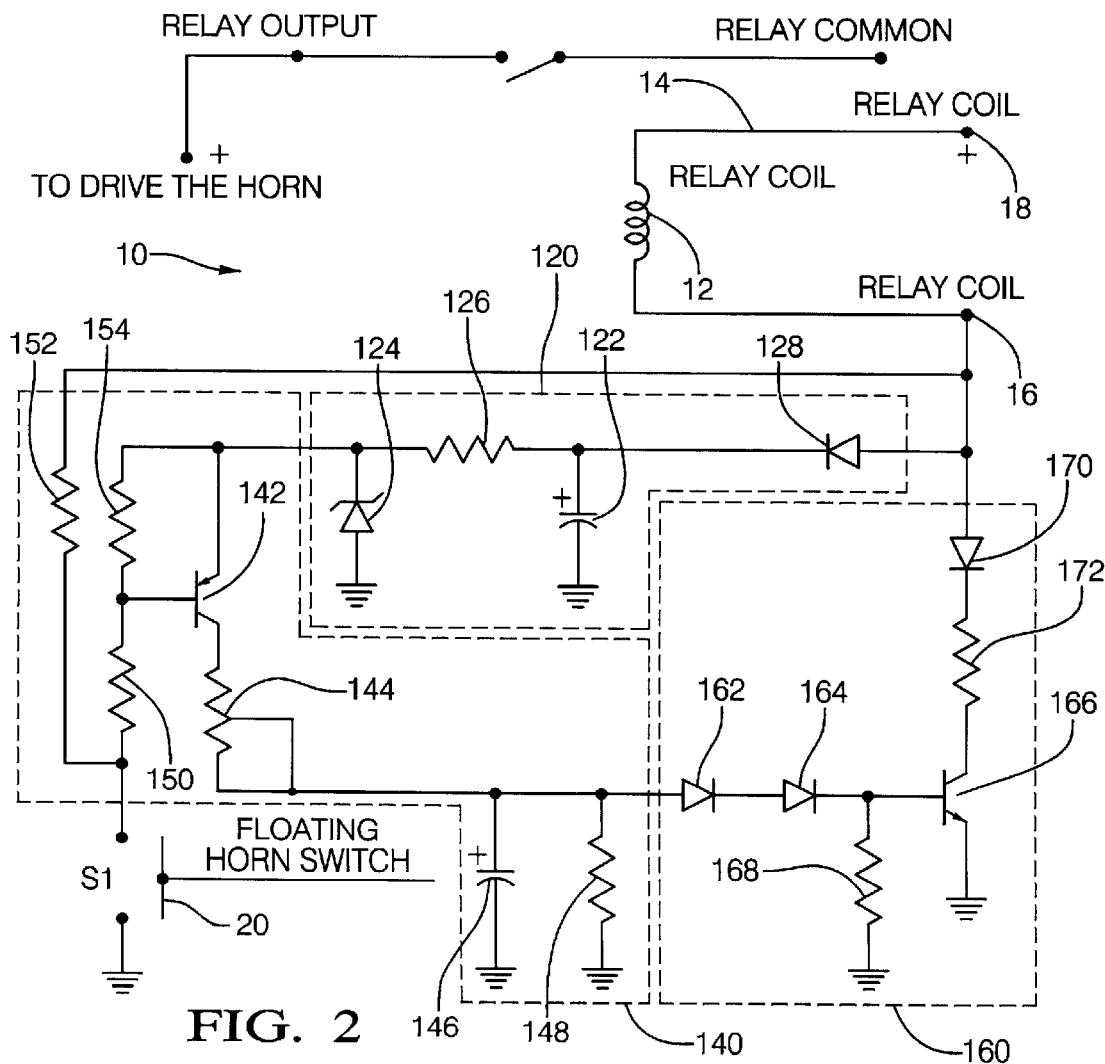
FIG. 2 depicts a preferred embodiment of the control circuit interposed in the horn circuit.

FIG. 2 depicts an exemplary embodiment of the invention implemented as the circuit shown, which is interposed with the horn circuit 10. The control circuit 100 includes but is not limited to three primary functional parts. The first being a voltage supply section 120, which is configured to supply a second section, the delay determination section 140 with excitation when the floating horn switch 20 is activated. The third, is a switching section 160, which upon receiving a predetermined input activates the relay coil 12 to in turn sound the horn.

The voltage supply section 120 includes a diode 128, a capacitor 122, a resistor 126 and a zener diode 124. The capacitor 122 stores a charge supplied through diode 128. During the first few milliseconds of operation, until the relay coil 12 has reached its steady state, the capacitor 122 supplies current for the remainder of the control circuit 100 to operate. After that, that is once the relay coil 12 current has attained a steady state, the relay coil 12 requires less current to maintain operation. Therefore, there remains a voltage on the relay coil low side 16, this voltage, which, while less than the relay coil high side 14 terminal voltage (typically by 2 or 3 volts), is adequate to sustain the operation of the control circuit 100. A desirable feature of an exemplary embodiment is operating the horn circuit from the relay coil low side 16. In addition, this is accomplished without employing any additional excitation circuitry or wiring.

The capacitor 122 charges through diode 128. When the horn is not operating, this charging time is significantly smaller than the discharging time to guarantee the capacitor has been fully charged. Once again, because there is a voltage difference on the relay coil 12, current flows through the relay coil 12 as long as the transistor 166 is conducting, that is on (although this current is small, it is adequate to maintain the relay engaged). The benefit of the voltage at the relay coil low side 16 is to keep capacitor 122 charging for all time, and thereby, the horn may operate indefinitely for as long as the floating horn switch 20 is pressed.

The benefit of diode 128 is to prevent capacitor 122 from discharging through transistor 166 when it is conducting. This keeps the voltage stored on capacitor 122 high and prevents any overload from being applied to the transistor 166.

Resistor 126 provides a limit to the current that can flow through the zener diode 124 under the conditions of an applied high voltage. The resistor 126 and zener diode 124 then establishing a constant voltage source for the activation of transistor 142 and the supply of the delay circuit, even when the battery voltage varies significantly (typically a range from 9 to 16 volts).

Transistor 142 is an npn type transistor configured in a circuit arrangement to be activated when the voltage on the base is zero or ground. The transistor 142 tams on allowing current to flow and charge the capacitor 146. If the voltage at the base is high, the transistor 146 is configured to be off.

Resistors 154, 150, and 152 are employed to enhance circuit operation and prevent any spurious noise from effecting the circuit operation. Operationally, for example, when the floating horn switch 20 is open (e.g., the operator is not pressing on it), the coil voltage is connected to the base of transistor 142 via resistors 152 and 150 to ensure that the base voltage of transistor 142 is maintained high, thereby ensuring that transistor 142 is off (that is, not conducting). However, if the floating horn switch, 20 is pressed, the base of transistor 142 is pulled to ground through resistor 150, and as a result transistor 142 will turn on. With transistor 142 turned on, the circuit starts the sequence of charging the capacitor 146. Capacitor 146 charges through the variable resistor 144 (which controls the delay time), when the voltage exceeds a predetermined trigger voltage the transistor 166 will turn on to conduct energizing the relay coil 12. As the relay coil 12 energizes, the relay connects sounding the horn.

It will be appreciated by those skilled in the art that the selection of particular values for the resistors and capacitor are dependent upon the particular application. In the embodiment disclosed, the element values chosen are selected to insure proper bias of the transistor 142 and adequate charge level of capacitor 122. Furthermore, the variable resistor 144 may remain variable or be replaced with fixed values upon installation in a particular horn system 10. Other values could of course, be utilized without deviating from the scope and breadth of the invention and the claims.

Turning now to the delay determination section 140 of the control circuit 100, which addresses generation of a desired time delay. The zener diode 124 functions to establish a stabilized voltage source for the transistor 142 so that the delay circuit response is more stable for variations in the supply voltage 18. This is accomplished by applying the same voltage to the capacitor 146 for each floating horn switch 20 activation. Thereby, causing the capacitor 146 to start from the same condition and charge at the substantially the same rate for any floating horn switch 20 activation. The charging of the capacitor 146 is defined by the equation as follows:

$$V\text{cap} = (V_{zener124} - V_{CE\_of\ the\ PNP}) * (1 - \exp(-t/\tau_2))$$

where $V_{zener124}$ is the zener diode 124 voltage;

$V_{CE\_of\ the\ PNP}$ is the collector emitter voltage across the transistor 142; and $\tau_2 = R(144) * C(146)$ However, for any applied voltage the value (Vzener124−VCE_of the PNP) is relatively constant. Therefore, the charge rate of the capacitor 146 is also maintained substantially constant for each activation of the horn. The voltage to which Vcap must charge to allow transistor 166 to turn on will therefore, take approximately the same amount of time, each time transistor 142 turns on. Again, because the applied voltage is maintained substantially constant, the delay time will not be a function of the applied voltage supply 18, it will instead be a function of the time constant defined by variable resistor 144 and capacitor 146.

Variable resistor 144 and capacitor 146 control charging time of capacitor 146. Variable resistor 144 and resistor 148 operate as a voltage divider. Therefore, the ratio between them is set high in order to assure that capacitor 146 undergoes sufficient charging to drive the remainder of the circuit and transistor 166. Resistor 148 also provides a discharge path for capacitor 146 when transistor 142 is off, thereby ensuring that capacitor 146 always initiates charging from the same voltage. Again, it will be appreciated, that numerous variations of the selection of components for implementing the above described functions and capabilities are possible. The resistors and capacitors may be selected as necessary to provide the desired charging time or time constant for the circuit. In an embodiment, a time constant of about 25 milliseconds was selected. Of course, and as applications may require, this value may vary.

Moving now to the switching section 160 of the control circuit 100, switching transistor 166 is driven via current through diodes 162 and 164. Thus, the voltage level to which the charging voltage of capacitor 146 must attain to activate the transistor 166 is defined as follows:

$V_{ON}$ transistor $166 = V_{162} + V_{164} + V_{BE} = 0.7 + 0.7 + 0.7 \geq 2.1$ volt. Therefore, when the voltage at capacitor 146 attains about 2.1 volts, transistor 166 will turn on.

The switching section 160 also includes diode 170 in series with resistor 172 connected to collector of transistor 166 and the relay coil low side 16 terminal. Diode 170 protects the control circuit 100 (e.g. transistor 166) from reverse bias voltages, while resistor 172 provides protection to transistor 166 from excessive current. Operationally, when transistor 166 is on, current flows from the relay coil low side 16, through diode 170 and resistor 172 and finally through transistor 166 thereby engaging the relay 12. To address the variations in supply voltages, and momentary current peaks, especially in the case of high supply voltages, the resistor 172 limits the current conducted by transistor 166. Further the rate of change of that current may also be large, therefore, it beneficial to limit that current and its rate of change to protect transistor 166 and increase its reliability. Again, as stated earlier, the relay coil 12 reaches to its steady state, there is no longer a maximum supply voltage at the relay coil low side 16 and the current flow required to maintain the relay coil 12 engaged would diminish. This sequence prevents transistor 166 from being overloaded and heated, thereby increasing its reliability, lifetime, and avoiding excessive power dissipation through transistor 166.

Finally, looking to the switching section 160 and the configuration of the components, it will be appreciated that the utilization of the particular circuit topology is not the only means for producing the desired result. For example, the application utilizing two diodes in series with the base of the transistor 166 to establish the turn on threshold of about 2.1 volts could be modified in various ways. More or less diodes are possible, use of a zener diode, as well as other methods of controlling the voltage are possible. It is only important to establish a threshold that is within the operating constraints established by the remainder of the control circuit 100.

The foregoing embodiment as disclosed provides a method and apparatus for detecting and avoiding inadvertent horn activations from a floating horn switch 20.

Figure 3:
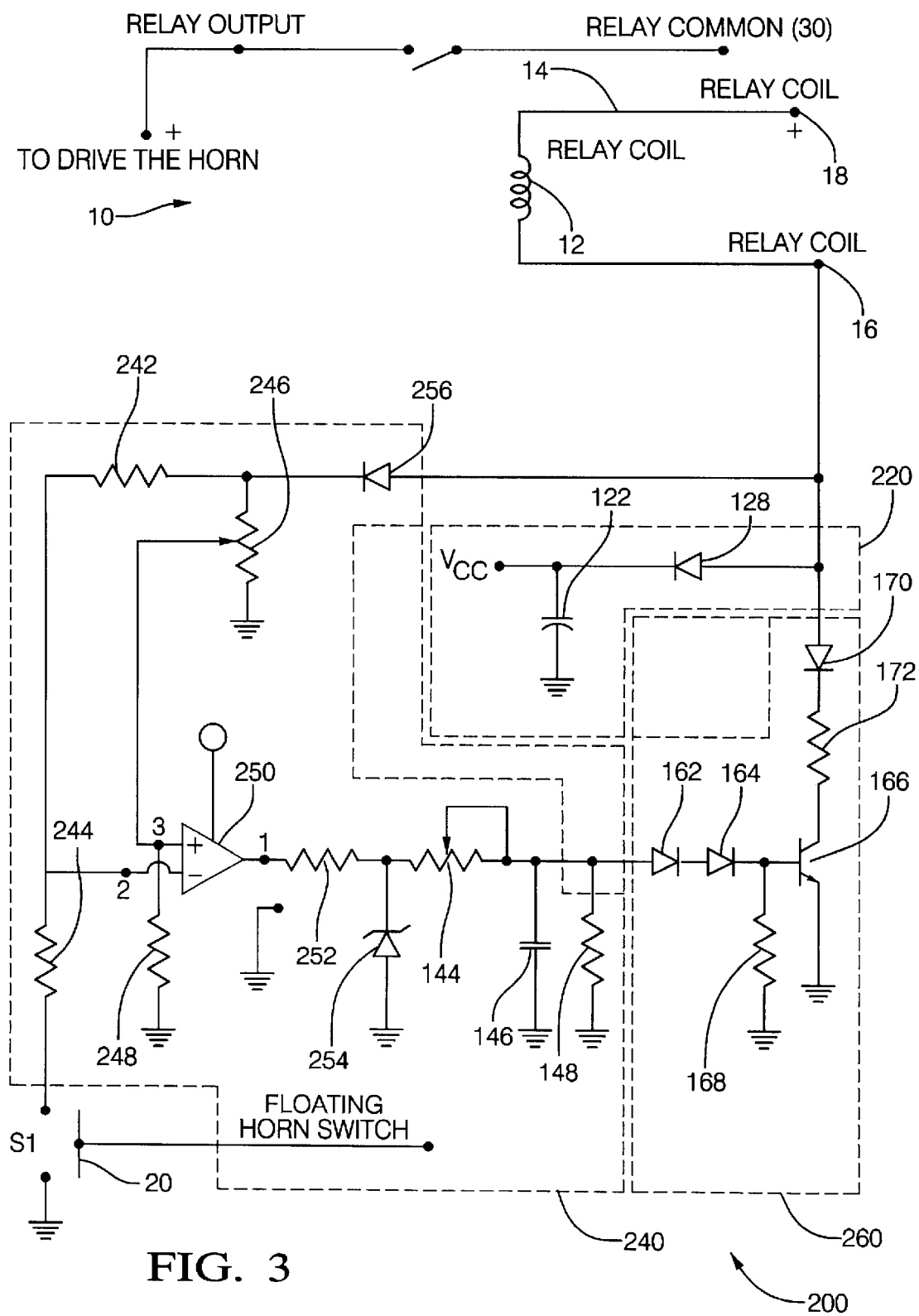
FIG. 3 depicts an alternative embodiment of the control circuit interposed in the horn circuit.
Figure 4:
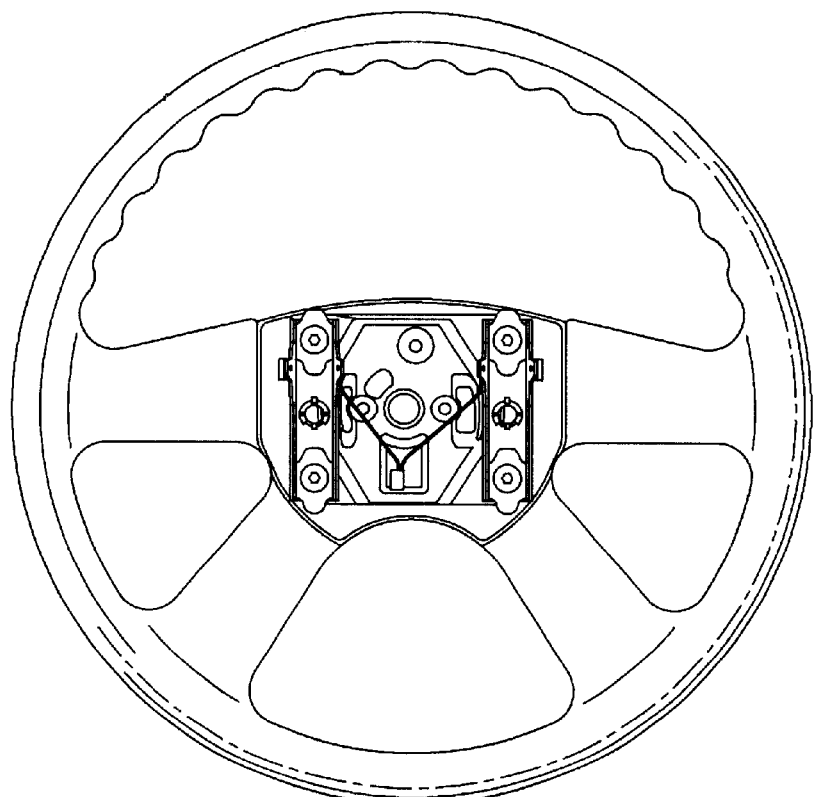
FIGS. 4-9 illustrate a floating horn switch.
Figure 5:
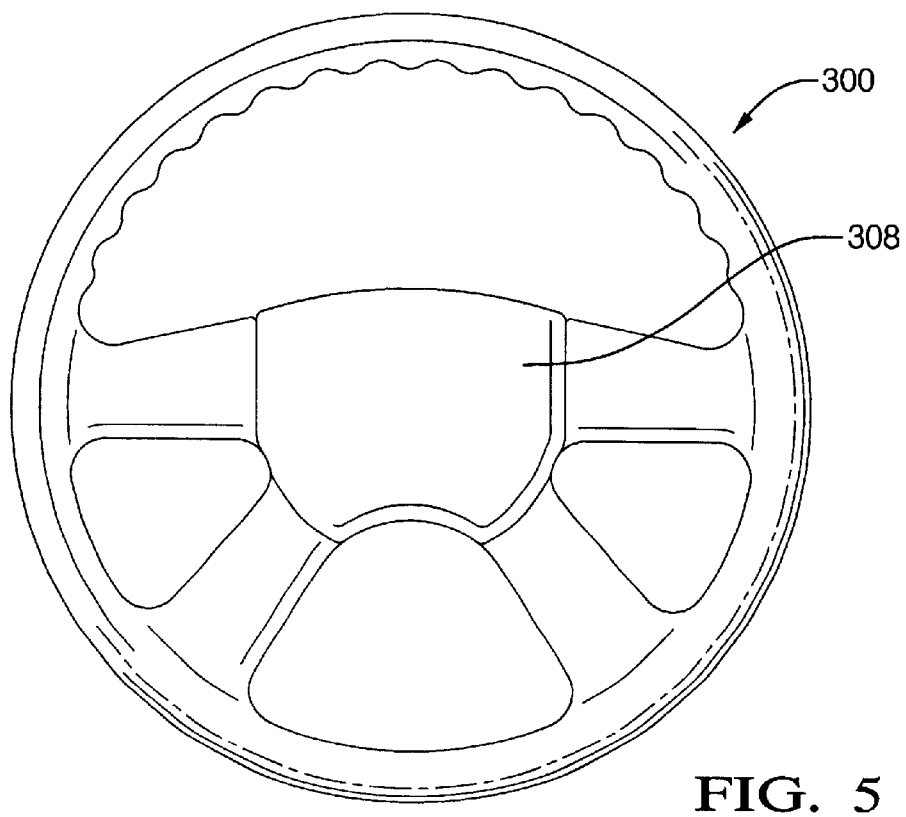
Figure 6:
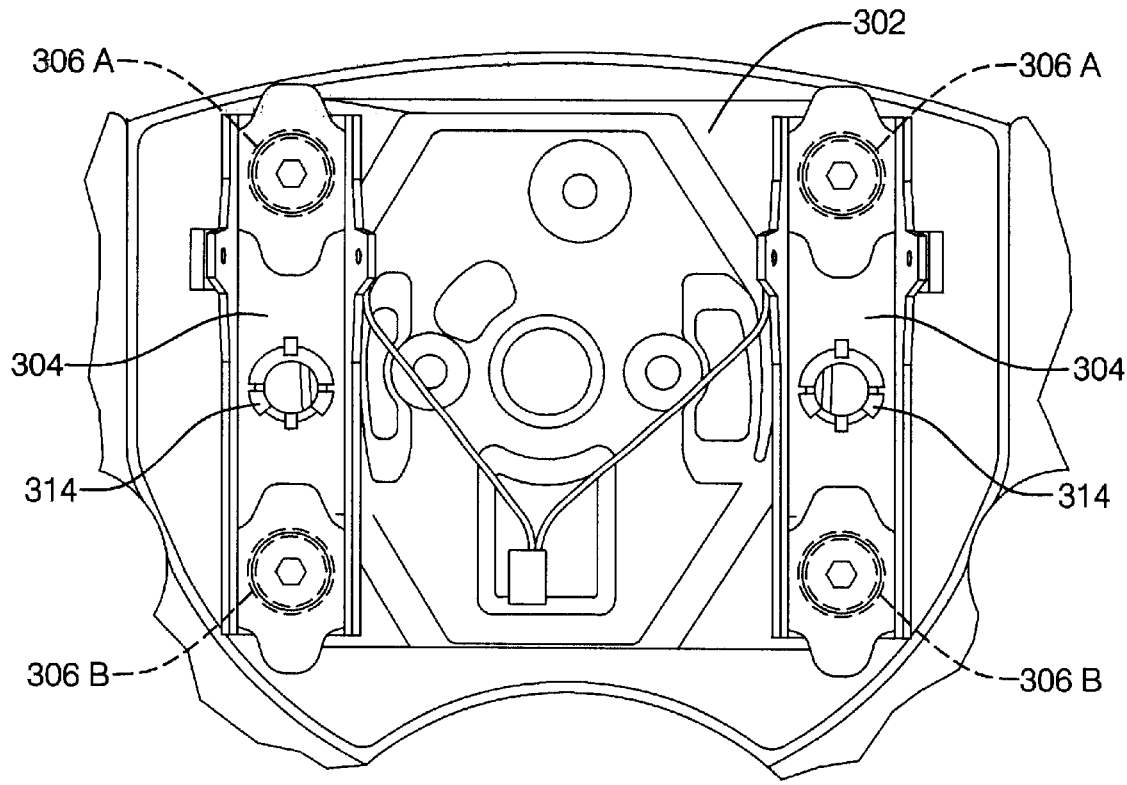
Figure 7:
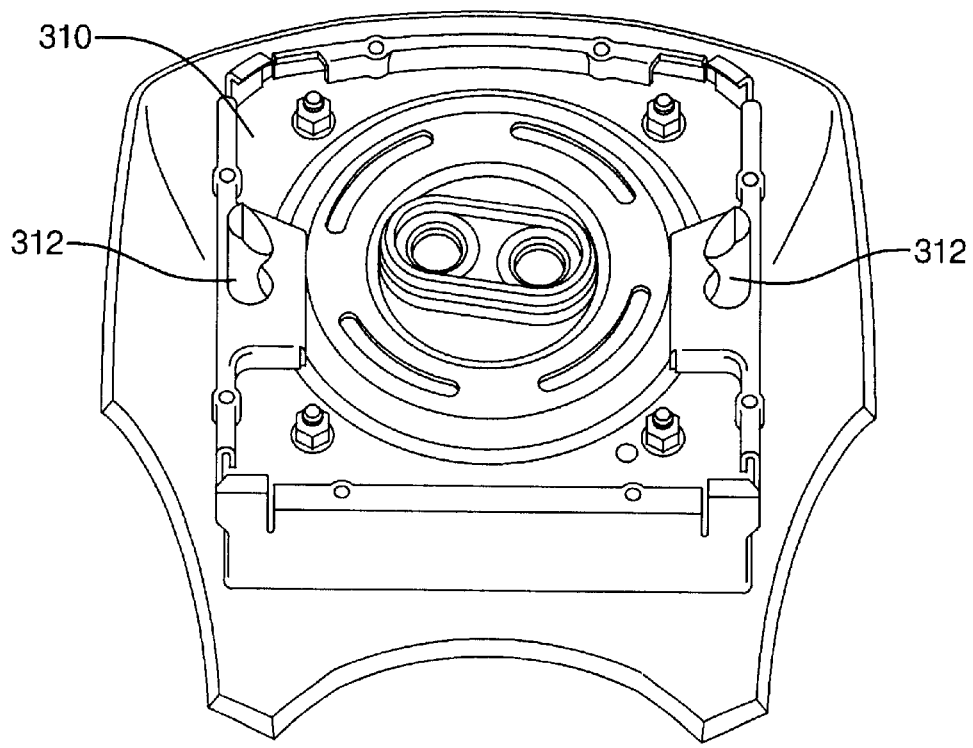
Figure 8:
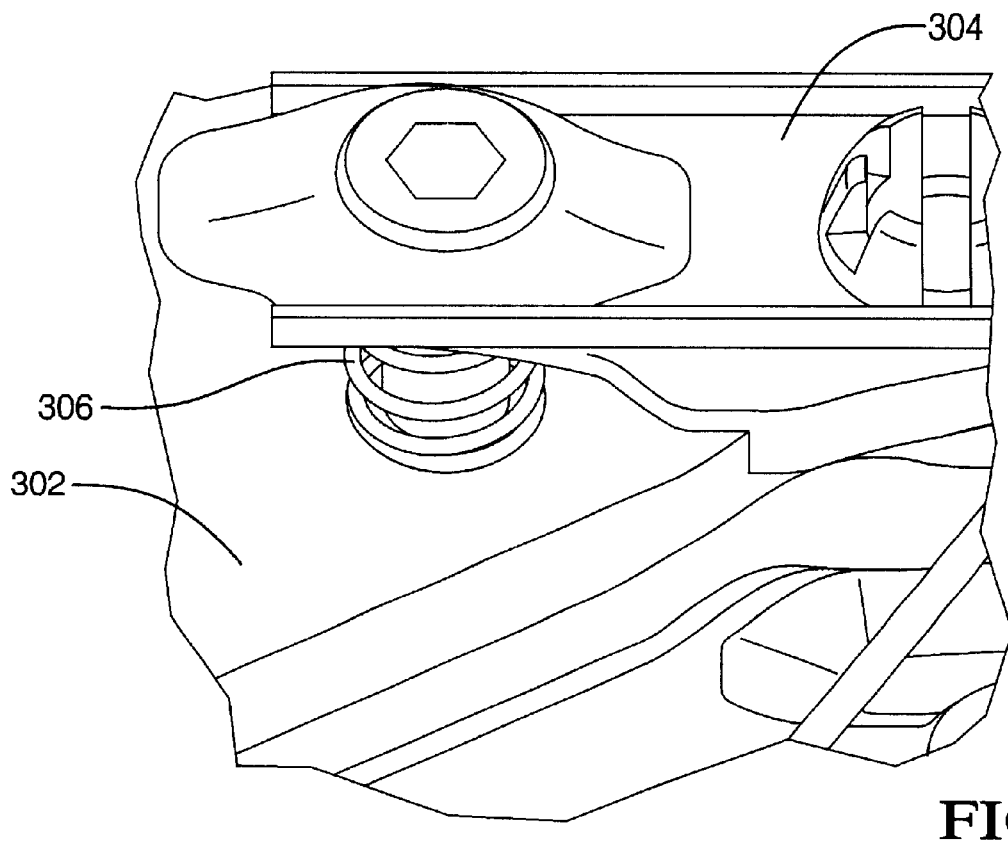
Figure 9:
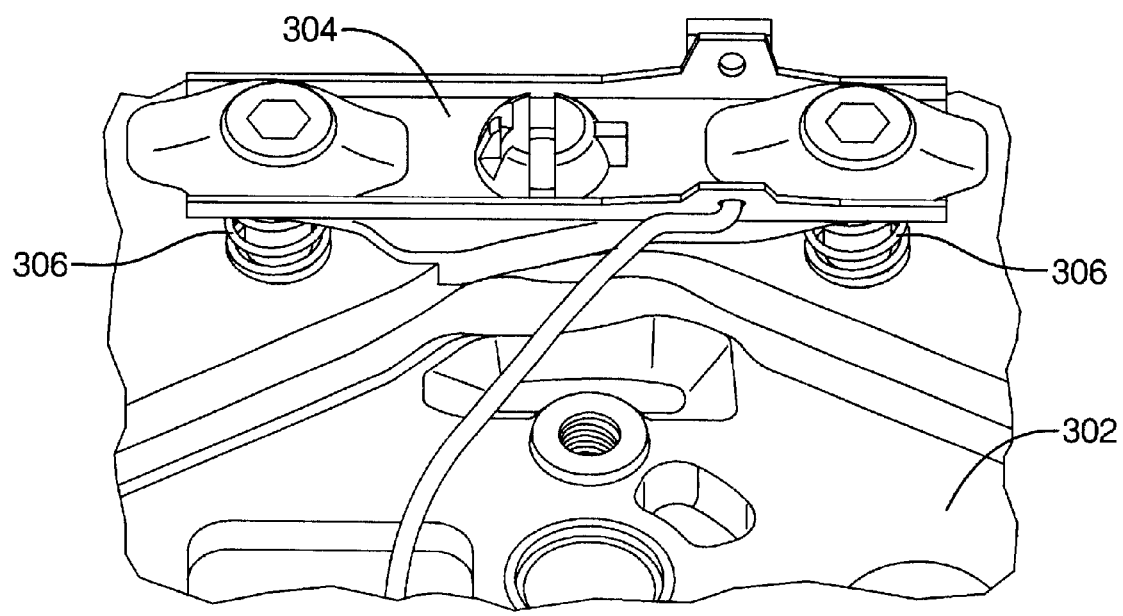

Referring now to FIG. 3, an alternative embodiment of the invention in the horn circuit 10 is depicted. In the alternative embodiment, an alternative control circuit 200 is depicted employing several functional parts similar to those disclosed above in control circuit 100 to facilitate the activation of the horn relay coil 12 upon activation of the floating horn switch 20. A second voltage supply section 220 employing capacitor 122 and diode 128 is depicted. As disclosed earlier, the diode 128 and capacitor 122 are arranged to maintain a stored supply voltage (VCC) to energize the remainder of the alternative control circuit, here 200. It is noteworthy to recognize as stated earlier, that when transistor 166 is on, and the relay coil is energized, the voltage across the coil terminal is reduced momentarily. However, the storage of capacitor 122 maintains the voltage so the VCC will be sustained thereby ensuring adequate excitation for the remainder of the alternative control circuit 200. Diode 128 ensures that capacitor 122 does not discharge through the transistor 166 when transistor is on.

A second delay determination section 240 of the alternative embodiment includes the a bridge circuit comprising two sets of voltage dividers, the first comprising resistors 246 and 248 establish a reference voltage at the non-inverting input to the operational amplifier 250. The second voltage divider comprising resistors 242 and 244 establish the sensed voltage at the inverting input to the operational amplifier 250. As long as the horn is not pressed and the floating horn switch is open, resistor 244 is not included in the bridge and the inverting terminal of the operational amplifier 250 is pulled up to the relay coil low side 16 terminal voltage (same as VCC). Therefore, the output of the operational amplifier will be driven to the negative supply, here ground or zero.

When the horn is pressed, thereby closing the floating horn switch 20, resistor 244 is included and the voltage division occurs. Under this condition, resistors 242, 244, 246, 248 are selected in a manner such that the non-inverting terminal voltage will be higher than the inverting terminal voltage and the operational amplifier 250 will provide a high output (e.g., drive to substantially VCC). Diode 256 allows the current to flow in one direction and prevent it from flowing in the other direction, to ensure maintaining the appropriate operations conditions and avoid improper operation when transistor 166 is turned on.

When the output of operational amplifier 250 is high, The current flows through resistor 252 through zener diode 254 to establish a fixed voltage reference for charging capacitor 146. This approach is similar to that disclosed with the control circuit 100 discussed earlier. Variable resistor 144 once again establishes a precise current flow from the fixed reference voltage established by the zener diode 254. The capacitor 146 charges at a predetermined rate to the voltage required for turning on transistor 166, and thereby energizing the relay coil 12. As discussed earlier, the predetermined charge rate of the capacitor 146 establishes a predetermined time delay, which once again eliminates the inadvertent horn activations due to high frequency short duration floating horn switch 20 closures.

When the time period that the operational amplifier 250 output is high is sufficient to charge the capacitor 146 to a predetermined value, then transistor 166 will open and the relay coil 12 will engage, allowing the horn to work. However, if the period is shorter, and therefore the capacitor 146 does not have enough time to reach the transistor 166 turn on threshold the horn will not work. As the abovementioned disclosure addresses, a predetermined value for the transistor 166 turn on threshold may be about 2.1 volts. As stated earlier the method or means of attaining the threshold voltage and charging time may vary depending upon the components selected and variations in the circuit topology.

It is noteworthy to appreciate that if the output of the operational amplifier 250 exceeds the reverse bias voltage of the zener diode 254 (in this case about 6.1 volts), then the zener diode 254 will limit the voltage to about 6.1 volts. This provides the circuit with voltage source stabilization, through a large potential range of applied voltage (or VCC). In the embodiment disclosed and depicted in FIG. 3., a range of 8 to 42 volts is possible. The charging equations for capacitor 146 are similar to those described earlier except here the zener diode 254 has been selected as about 6.1 volts. Resistor 252 is employed to protect the zener diode 254 and operational amplifier 250 from excess current, this is especially the case with the application of a high voltage.

Resistor 148 once again establishes a voltage divider with resistor 144 and is selected to allow capacitor 146 to charge to high value of the voltage at the zener diode 254. Once again, the ratio between them is set high in order to assure that capacitor 146 undergoes sufficient charging to drive the remainder of the circuit and transistor 166. Resistor 148 also provides a discharge path for capacitor 146 when transistor 142 is off, thereby ensuring that capacitor 146 always initiates charging from the same voltage.

Moving now to the second switching section 260, switching transistor 166 is driven via current through diodes 162 and 164. Thus, the voltage level to which the charging voltage of capacitor 146 must attain to activate the transistor 166 is the same as defined for control circuit 100 of greater than 2.1 volts. Resistor 168 is utilized to facilitate the rapid discharge of capacitor 146. The discharge is through the parallel combination of resistors 148 and 168, this approach enables having transistor 166 turn off rapidly to disengage the relay coil 12 and shut off the horn when the operator releases the pressure on the floating horn switch 20.

Likewise, the switching section 260 also includes diode 170 in series with resistor 172 connected to collector of transistor 166 and the relay coil low side 16 terminal. Diode 170 protects the control circuit 200 (e.g. transistor 166) from reverse bias voltages, while resistor 172 provides protection to transistor 166 from excessive current. Operationally, when transistor 166 is on, current flows from the relay coil low side 16, through diode 170 and resistor 172 and finally through transistor 166 thereby engaging the relay 12. To address the variations in the supply voltage 18, and momentary current peaks, especially in the case of high supply voltages, the resistor 172 limits the current conducted by transistor 166. Further the rate of change of that current may also be large, therefore, it beneficial to limit that current and its rate of change to protect transistor 166 and increase its reliability. Again, as stated earlier, the relay coil 12 reaches to its steady state, there is no longer a maximum supply voltage at the relay coil low side 16 and the current flow required to maintain the relay coil 12 engaged would diminish. This sequence prevents transistor 166 from being overloaded and heated, thereby increasing its reliability, lifetime, and avoiding excessive power dissipation through transistor 166.

Finally, looking the configuration of the components, it will be appreciated that the utilization of the particular circuit topology is not the only means for producing the desired result. Again for example, in the switching section 260, the application utilizing two diodes 162 and 164 in series with the base of the transistor 166 to establish the turn on threshold of about 2.1 volts could be modified in various ways. More or less diodes are possible, use of a zener diode, as well as other methods of controlling the voltage are possible. It is only important to establish a threshold that is within the operating constraints established by the remainder of the control circuit 200.

The foregoing embodiment as disclosed provides a method and apparatus for detecting and avoiding inadvertent horn activations from a floating horn switch 20.

Referring now to FIGS. 5-9, a floating horn switch is illustrated. It is noted that the floating horn switch illustrated herein is but one switch in which the method and apparatus of an exemplary embodiment of the present invention may be applied. Here, a steering wheel 300 has a central hub 302, which in addition to providing a means for securing the steering wheel to a steering shaft of a steering column, provides one of the two required conductive surfaces to complete the horn activation circuit.

A pair of movable members 304 are movably secured to hub 302. Each movable member is energized with an electrical current sufficient to activate the vehicle horn when movable member 304 makes contact with hub 302, thus completing the electrical circuit. In order to position the movable members away from hub 302, a plurality of springs 306 provide an urging force to maintain movable members 304 in a facing spaced relationship with respect to hub 302. In addition, movable members 304 may also be provided with insulating members to prevent contact between members 304 and hub 302, and any other conductive items which may inadvertently activate the horn.

Accordingly, and in order to activate the horn, an urging force sufficient enough to overcome the urging force of springs 306 must be applied to movable member 304 by applying pressure to cover 308 of steering wheel 300. Cover 308 is also secured to an airbag module 310 having a pair of fasteners 312 which are received within a pair of fasten openings 314 in movable members 304.

In an exemplary embodiment, and in order to negate most undesirable inadvertent horn activations due to switch bounce, four springs are used with two movable members in addition to the use of a discriminating circuit as disclosed herein. The uppermost springs 306A (FIG. 6) provide an urging force of approximately 20 newtons which must be overcome in order to activate the horn. The lower most springs 306B (FIG. 6) provide an urging force of approximately 30 newtons which must be overcome in order to activate the horn. Thus, and in order to activate the horn using the discriminating device as disclosed herein, a force of approximately 40 newtons at one of the corners of cover 308 is required to activate the horn. Of course, this force may vary as the user applies a force at different locations upon cover 308. For example, a higher force may be required at the center of cover 308 as the point of application becomes remote from the location of springs 306.

It is noted that in order to provide a floating horn switch with a similar performance as the one disclosed herein (e.g., elimination of most inadvertent horn activation) without the use of the discriminating circuit, the urging force of springs 306A and 306B must be increased to 50 newtons. Thus, the user applied force at the corners of cover 308 or points in close proximity to springs 306, must be increased to 70-80 newtons in order to overcome the urging force of 50 newtons for springs 306A and 306B. This higher activation force is undesirable. Accordingly, the control circuit of the present invention allows inadvertent horn activations to be eliminated without increasing the urging force of springs 306.

It is, of course, contemplated that in accordance with the present invention and as applications require, the urging force provided by springs 308 may vary to be lesser or greater than those previously mentioned while also providing a means for eliminating inadvertent court activation.

In accordance with an exemplary embodiment of the present invention, the urging force required for springs 306 can be sufficiently less than the springs in a floating horn switch that does not employ the method and apparatus of the present application. Therefore, the user applied force to the cover of a steering wheel in order to activate the vehicle horn may be lowered without causing undesirable horn activations due to a lower biasing force of springs 306.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A horn activation system, comprising:
   a) a floating horn switch being configured and positioned to activate a horn in response to a force applied to said switch;
   b) a power supply for activating said horn; and
   c) a discriminating device for discriminating between forces being applied to said horn activation system, a delay prevents said switch from activating said horn when said force is applied to said switch for a time period less than a first value.

2. The horn activation switch as in claim 1, further comprising:
   d) a voltage supply circuit being connected to said discriminating device and a relay coil.

3. A control circuit for a horn having a floating switch, comprising:
   a) a voltage supply section for supplying an operating current to said control circuit; and
   b) a discriminating device providing a means for determining whether a portion of said operating current shall be supplied to said horn.

4. A control circuit for a horn having a switch, comprising:
   a) a voltage supply section for supplying an operating current to said control circuit; and
   b) a discrminating device providing a means for determining whether a portion of said operating current shall be supplied to said horn, wherein said voltage supply section includes a capacitor for receiving a charge for energizing a coil, said discriminating device determines whether said capacitor shall receive said charge.

5. The control circuit as in claim 4, further comprising:
   c) a steering wheel in which the discriminating device is located, said horn being activated when a closing force is applied to said switch for a predetermined time period, said discriminating device determining whether said predetermined time period has been met.

6. The control circuit as in claim 5, wherein said steering wheel includes an airbag module.

7. A horn activation system, comprising:
   a) a switch being configured and positioned to activate a horn in response to a force applied to said switch;
   b) a power supply for activating said horn; and
   c) a discriminating device for discriminating between forces being applied to said horn activation system, said delay prevents said switch from activating said horn when said force is applied to said switch for a time period less than a first value, wherein said activation system is driven by a low side of a relay coil.

8. A horn activation system, comprising:
   a) a switch being configured and positioned to activate a horn in response to a force applied to said switch;
   b) a power supply for activating said horn; and
   c) a discriminating device for discriminating between forces being applied to said horn activation system, said delay prevents said switch from activating said horn when said force is applied to said switch for a time period less than a first value, wherein said power supply is a voltage supply section for supplying an operating current to said control circuit; said voltage supply section includes a capacitor for receiving a charge for energizing a coil, said discriminating device determining whether said capacitor shall receive said charge.

9. A horn activation system as in claim 8, wherein said horn activation system is driven by a low side of a relay coil.

10. A horn activation system, comprising:
    a) a floating horn switch being configured and positioned to activate a horn in response to a force applied to said switch, wherein said floating horn switch employs a pair of movable members each having an upper and lower biasing members for maintaining said pair of movable members and a facing spaced relationship with respect to a contact service of a couple of a steering wheel;
    b) a power supply for activating said horn; and
    c) a discriminating device for discriminating between forces being applied to said horn activation system, a delay prevents said switch from activating said horn when said force is applied to said switch for a time period less than a first value.

11. The horn activation system as in claim 10, wherein said upper biasing members provide an urging force of approximately 20 newtons in order to maintain said movable members in said facing spaced relationship and said lower biasing members provide an urging force of approximately 30 newtons in order to maintain said movable members and said facing spaced relationship.

* * * * *